(12) United States Patent
Toda et al.

(10) Patent No.: US 8,077,405 B2
(45) Date of Patent: Dec. 13, 2011

(54) OPTICAL ARTICLE AND METHOD FOR PRODUCING THE SAME

(75) Inventors: Mitsuhiro Toda, Minamiminowa-mura (JP); Yuta Hoshino, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/621,357

(22) Filed: Nov. 18, 2009

(65) Prior Publication Data

US 2010/0134752 A1 Jun. 3, 2010

(30) Foreign Application Priority Data

Dec. 1, 2008 (JP) ................................. 2008-306049

(51) Int. Cl.
*G02B 1/00* (2006.01)
(52) U.S. Cl. ........................................ 359/796; 351/166
(58) Field of Classification Search .................. 359/642, 359/741, 796, 797; 351/159, 166
See application file for complete search history.

(56) References Cited

U.S. PATENT DOCUMENTS

| 4,930,879 A * | 6/1990 | Iryo et al. ...................... 359/642 |
| 6,248,431 B1 * | 6/2001 | Jiang et al. ..................... 428/220 |
| 2007/0183056 A1 * | 8/2007 | Conte et al. .................... 359/642 |

FOREIGN PATENT DOCUMENTS

| JP | 07-056002 | 3/1995 |
| JP | 09-113702 | 5/1997 |

* cited by examiner

*Primary Examiner* — Darryl J Collins
(74) *Attorney, Agent, or Firm* — DLA Piper LLP (US)

(57) ABSTRACT

An optical article includes: an optical substrate, and a functional layer laminated on the surface of the optical substrate, the functional layer having a thickness T μm that satisfies the following condition:

$$6.5dn + 4.0 \leq T \leq 100$$

wherein the thickness T is larger than 5 μm, and dn is the refractive index difference at the boundary of the optical substrate and the functional layer and satisfies the following condition:

$$0.06 \leq dn \leq 0.4.$$

16 Claims, 12 Drawing Sheets

| NBS SCALE | PERCEPTION OF COLOR DIFFERENCE | |
|---|---|---|
| 0.0 ~ 0.5 | trace | BARELY PERCEPTIBLE |
| 0.5 ~ 1.5 | slight | SLIGHTLY PERCEPTIBLE |
| 1.5 ~ 3.0 | noticeable | APPRECIABLE |
| 3.0 ~ 6.0 | appreciable | NOTICEABLE |
| 6.0 ~ 12.0 | much | LARGE |
| 12.0 OR MORE | very much | EXTREMELY LARGE |

| No. | BOARD REFRACTIVE INDEX | FILM REFRACTIVE INDEX (REFRACTIVE INDEX DIFFERENCE) | FILM THICKNESS nm | INTERFERENCE FRINGES | Eab | PERCEPTION OF COLOR DIFFERENCE(ΔE*ab) ON THE NBS SCALE (NATIONAL BUREAU OF STANDARDS) | SIMULATION RESULT dEav |
|---|---|---|---|---|---|---|---|
| E1 | 1.67 | 1.55 (0.12) | 12000 | EXCELLENT | 0.35 | trace | 0.28 |
| E2 | 1.67 | 1.55 (0.12) | 17000 | EXCELLENT | 0.12 | trace | 0.15 |
| E3 | 1.74 | 1.55 (0.19) | 9500 | GOOD | 0.64 | slight | 0.71 |
| E4 | 1.74 | 1.55 (0.19) | 25000 | EXCELLENT | 0.08 | trace | 0.11 |
| R1 | 1.67 | 1.55 (0.12) | 3000 | POOR | 3.54 | noticeable | 3.76 |
| R2 | 1.74 | 1.55 (0.19) | 2000 | POOR | 5.70 | much | 6.83 |

FIG. 6

| MODEL | D1 | D2 | D3 | D4 | D5 | D6 | D7 | D8 | D9 | D10 |
|---|---|---|---|---|---|---|---|---|---|---|
| FILM REFRACTIVE INDEX n1 | 1.90 | 1.67 | 1.90 | 1.74 | 1.78 | 1.90 | 1.90 | 1.90 | 1.67 | 1.74 |
| FILM THICKNESS T (nm) | 7000 | 5100 | 6600 | 5300 | 5700 | 6400 | 5800 | 5400 | 5300 | 5400 |
| BOARD REFRACTIVE INDEX n2 | 1.50 | 1.56 | 1.56 | 1.60 | 1.60 | 1.60 | 1.67 | 1.70 | 1.80 | 1.90 |
| REFRACTIVE INDEX DIFFERENCE dn | 0.40 | 0.11 | 0.34 | 0.14 | 0.18 | 0.30 | 0.23 | 0.20 | 0.13 | 0.16 |
| dEav | 1.46 | 1.47 | 1.49 | 1.46 | 1.49 | 1.47 | 1.49 | 1.46 | 1.47 | 1.47 |

FIG. 9

| REFERENCE MODEL | RD1 | RD2 | RD3 | RD4 | RD5 |
|---|---|---|---|---|---|
| FILM REFRACTIVE INDEX n1 | 1.50 | 1.50 | 1.50 | 1.90 | 1.90 |
| FILM THICKNESS nm T | 6500 | 5900 | 5500 | 6500 | 5900 |
| BOARD REFRACTIVE INDEX n2 | 1.90 | 1.80 | 1.74 | 1.50 | 1.60 |
| REFRACTIVE INDEX DIFFERENCE dn | 0.40 | 0.30 | 0.24 | 0.40 | 0.30 |
| ΔE dEav | 3.52 | 3.54 | 3.48 | 1.77 | 1.89 |

FIG.10

| MODEL | D11 | D12 | D13 | D14 | D15 | D16 | D17 | D18 | D19 | D20 |
|---|---|---|---|---|---|---|---|---|---|---|
| FILM REFRACTIVE INDEX n1 | 1.56 | 1.80 | 1.67 | 1.80 | 1.78 | 1.78 | 1.63 | 1.90 | 1.50 | 1.67 |
| FILM THICKNESS T (nm) | 5200 | 8100 | 6200 | 7400 | 6700 | 5500 | 5100 | 5900 | 10700 | 7800 |
| BOARD REFRACTIVE INDEX n2 | 1.50 | 1.50 | 1.56 | 1.56 | 1.60 | 1.67 | 1.70 | 1.74 | 1.90 | 1.90 |
| REFRACTIVE INDEX DIFFERENCE dn | 0.06 | 0.30 | 0.11 | 0.24 | 0.18 | 0.11 | 0.07 | 0.16 | 0.40 | 0.23 |
| dEav | 1.00 | 0.99 | 0.99 | 0.97 | 1.00 | 0.98 | 0.98 | 1.00 | 0.99 | 1.00 |

FIG.11

| MODEL | D21 | D22 | D23 | D24 | D25 | D26 | D27 | D28 | D29 | D30 |
|---|---|---|---|---|---|---|---|---|---|---|
| FILM REFRACTIVE INDEX n1 | 1.70 | 1.80 | 1.78 | 1.74 | 1.90 | 1.80 | 1.80 | 1.90 | 1.56 | 1.67 |
| FILM THICKNESS T (nm) | 9800 | 10900 | 9400 | 8300 | 10000 | 7500 | 6900 | 7600 | 13700 | 10200 |
| BOARD REFRACTIVE INDEX n2 | 1.50 | 1.50 | 1.56 | 1.60 | 1.60 | 1.67 | 1.70 | 1.74 | 1.90 | 1.90 |
| REFRACTIVE INDEX DIFFERENCE dn | 0.20 | 0.30 | 0.22 | 0.14 | 0.30 | 0.13 | 0.10 | 0.16 | 0.34 | 0.23 |
| dEav | 0.50 | 0.50 | 0.50 | 0.50 | 0.49 | 0.50 | 0.48 | 0.49 | 0.50 | 0.50 |

FIG.12

| MODEL | D31 | D32 | D33 | D34 | D35 | D36 | D37 | D38 | D39 | D40 |
|---|---|---|---|---|---|---|---|---|---|---|
| FILM REFRACTIVE INDEX n1 | 1.80 | 1.90 | 1.90 | 1.80 | 1.90 | 1.90 | 1.90 | 1.90 | 1.90 | 1.90 |
| FILM THICKNESS T (nm) | 14100 | 15800 | 14400 | 11400 | 13500 | 11400 | 10300 | 9300 | 8200 | 7700 |
| BOARD REFRACTIVE INDEX n2 | 1.50 | 1.50 | 1.56 | 1.60 | 1.60 | 1.67 | 1.70 | 1.74 | 1.78 | 1.80 |
| REFRACTIVE INDEX DIFFERENCE dn | 0.30 | 0.40 | 0.34 | 0.20 | 0.30 | 0.23 | 0.20 | 0.16 | 0.12 | 0.10 |
| dEav | 0.27 | 0.30 | 0.30 | 0.30 | 0.26 | 0.30 | 0.30 | 0.30 | 0.30 | 0.27 |

FIG.13

| MODEL | D41 | D42 | D43 | D44 | D45 | D46 | D47 | D48 | D49 | D50 |
|---|---|---|---|---|---|---|---|---|---|---|
| FILM REFRACTIVE INDEX n1 | 1.56 | 1.78 | 1.70 | 1.50 | 1.90 | 1.50 | 1.60 | 1.56 | 1.56 | 1.63 |
| FILM THICKNESS T (nm) | 10200 | 17900 | 13600 | 13400 | 16700 | 16900 | 10200 | 15200 | 17400 | 14000 |
| BOARD REFRACTIVE INDEX n2 | 1.50 | 1.50 | 1.56 | 1.60 | 1.60 | 1.67 | 1.67 | 1.70 | 1.74 | 1.78 |
| REFRACTIVE INDEX DIFFERENCE dn | 0.06 | 0.28 | 0.14 | 0.10 | 0.30 | 0.17 | 0.07 | 0.14 | 0.18 | 0.15 |
| dEav | 0.20 | 0.20 | 0.20 | 0.20 | 0.20 | 0.19 | 0.20 | 0.18 | 0.20 | 0.19 |

FIG.14

OPTICAL ARTICLE AND METHOD FOR PRODUCING THE SAME

BACKGROUND

1. Technical Field

The present invention relates to an optical article with at least one side thereof facing the outside, such as a spectacle lens, and also to a method for producing the same.

2. Related Art

JP-A-9-113702 (Patent Document 1) describes provision of an optical article provided with a coating that has high environmental resistance and can be made transparent. For this purpose, a degeneration layer and a hard coating layer are formed on a transparent resin substrate by CVD; the degeneration layer contains at least one of Si and Ti and has a refractive index varying in the thickness direction, while the hard coating layer contains Si and O. The hard coating layer is described to have a thickness of not less than 0.4 μm and not more than 5 μm.

JP-A-7-56002 (Patent Document 2) describes uniform reduction of the reflectance of a plastic board over a wide range. It is described that for this purpose, when forming a hard coating layer on a plastic board to protect the plastic board in terms of strength, the hard coating layer is formed to have substantially the same refractive index as the refractive index of the plastic board at the portion where the hard coating layer comes in contact with the plastic board, and also that the refractive index of the hard coating layer varies continuously or gradually in the thickness direction.

Optical substrates made of plastic, such as plastic lenses, are lightweight as compared with glass lenses, which are one kind of optical substrates made of glass, and also have excellent formability, workability, and dyeing affinity, together with low breakability and high safety. Accordingly, they are widely used in the field of spectacle lenses. The plastic material (CR-39) developed by PPG Industries, U.S., in the 1940's has, as a spectacle lens material, an excellent balance of physical properties. Up to now, the plastic material (CR-39) has been long used as a material for plastic lenses. However, the refractive index thereof is as low as 1.50, and there are problems that in the case of lenses with minus power, such a lens has a large edge thickness, while in the case of plus lenses, the thickness at the center thereof is large.

In order to reduce the thickness of a plastic lens, the refractive index of the substrate has to be increased. The refractive index of plastic materials has been increased from 1.50 to 1.56, 1.60, 1.67, 1.70, 1.74, and 1.76, and thus materials with a high refractive index have been developed. Nowadays, plastic spectacle lenses of various refractive indexes are commercially available.

Optical substrates made of plastic are prone to scratches. To make up for this problem, a layer (film) called hard coating is often formed on the surface of the substrate to prevent scratches. The thickness of such a hard coating is approximately 1 to 5 μm. Materials typically used for forming the hard coating layer are thermosetting silicon-based resins and UV-curable organic resins. The refractive index of these materials is about 1.50 to about 1.55. When a thin film is formed on a plastic substrate with a high refractive index (e.g., 1.60 or more), interference fringes are formed due to the difference in refractive index and nonuniformity in the thickness of the film.

In a spectacle lens, such interference fringes will not affect the optical performance of the lens itself, but they degrade the appearance or cause reflected glare. Accordingly, in order to increase the commercial value, elimination of interference fringes is desired. In particular, although plastic lenses having a ultra-high refractive index (e.g., 1.70 or more) has a significant advantage of allowing production of thin, lightweight spectacle lenses, the resulting interference fringes are denser and more apparent.

One method for suppressing the formation of interference fringes is to form a hard coating layer containing a metal oxide for adjusting refractive index, so that the refractive indexes of the hard coating layer and the plastic lens substrate are comparable. For example, according to the above Patent Documents 1 and 2, the refractive index varies in the thickness direction so that there is no or little difference in refractive index at the portion where the hard coating layer and the plastic substrate are in contact with each other, thereby reducing the reflectance. Further, the refractive index is allowed to continuously vary so that the refractive index of the surface is lowered, thereby reducing the reflectance. In this method, complete suppression of interference fringes requires a special hard coating to be designed, managed, and constructed for every substrate. However, for the production of coatings with various refractive indexes, a manufacturing facility is required for each case. This imposes a heavy burden on manufacturers.

In addition, although the original purpose of the hard coating layer is not to adjust the refractive index to suit a substrate, but to serve as a layer that imparts the substrate with weather resistance, abrasion resistance, and like various characteristics, as the refractive index of the layer increases, it becomes difficult to satisfy all these conditions.

Further, in many cases, an antireflection film is formed on the hard coating layer. When the refractive index of the hard coating layer differs, a special antireflection film also has to be designed for each case. Accordingly, even when the refractive index of a plastic lens is increased, thin, lightweight spectacle lenses and spectacles cannot necessarily be provided, and it is difficult to satisfy all the various quality characteristics.

SUMMARY

One aspect of the invention provides an optical article comprising an optical substrate and a functional layer laminated on the surface of the optical substrate and having at least one layer, the functional layer having a thickness T μm that satisfies the following condition:

$$6.5 dn + 4.0 \leq T \leq 100 \quad (1)$$

wherein the thickness T is larger than 5 μm, and dn is the refractive index difference at the e-line (546 nm) at the boundary of the optical substrate and the functional layer and satisfies the following condition:

$$0.06 \leq dn \leq 0.4 \quad (2).$$

In accordance with the aspect of the invention, within the range of formula (2), the difference in refractive index is allowed at the interface between the functional layer, such as a hard coating layer, and the optical substrate. Further, instead of reducing the thickness of the functional layer, the thickness is increased within the range of formula (1), whereby appearance of interference fringes can be suppressed and/or human perception of interference fringes can be suppressed. In the case where the thickness is below the range of formula (1), with the functional layer having a thickness nonuniformity of about ±30%, when the optical article is observed using a light source equivalent to a three band daylight fluorescent (F10), color difference due to interference fringes may be appreciable. Such a case is thus undesirable. In the case where the thickness exceeds the range of formula (1), this makes it difficult to maintain the surface accuracy of the functional layer. Accordingly, cracks are expected due to the volume change caused by drying during the film formation. Such a case is thus undesirable.

It is preferable that the thickness T of the functional layer satisfies the following condition:

$$10.4dn+4.0 \leq T \leq 100 \quad (3).$$

Although color difference due to interference fringes may be slightly perceptible, the degree thereof is smaller.

Further, it is preferable that the thickness T of the functional layer satisfies the following condition:

$$18.7dn+4.2 \leq T \leq 100 \quad (4).$$

Color difference due to interference fringes is mitigated to the degree that the difference is barely perceptible.

Further, it is preferable that the thickness T of the functional layer satisfies the following condition:

$$28.7dn+4.3 \leq T \leq 100 \quad (5).$$

Although color difference due to interference fringes may be barely perceptible, the degree thereof is smaller.

Further, it is preferable that the thickness T of the functional layer satisfies the following condition:

$$35.2dn+4.4 \leq T \leq 100 \quad (6).$$

Almost no color difference due to interference fringes is observable.

It is also preferable that the thickness T of the functional layer is not more than 50 μm. Accordingly, the surface accuracy of the functional layer can be more easily achieved, and the degree of perception of color difference due to interference fringes can be reduced.

A typical functional layer contains a hard coating layer. The functional layer may be a multilayer film, and may contain, for example, in addition to the hard coating layer, a primer layer laminated between the hard coating layer and the optical substrate. Further, the optical article may have an antireflection film laminated on the functional layer. The optical article may also have an antifouling film laminated on the antireflection film.

A typical optical substrate is a plastic lens substrate, for example, a spectacle lens.

Another aspect of the invention provides a pair of spectacles comprising the above spectacle lens and a frame having mounted thereto the spectacle lens.

Still another aspect of the invention provides a system including the above optical article that faces the outside and for seeing an image through the optical article. Typical examples of such systems are televisions, displays, windows, and the like.

Still another aspect of the invention provides a method for producing of an optical article, including forming a functional layer on the surface of an optical substrate. The thickness T μm of the functional layer satisfies the condition of formula (1).

Still another aspect of the invention provides a method for film production, including forming a functional layer on the surface of an optical substrate. The thickness T μm of the functional layer satisfies the condition of formula (1).

BRIEF DESCRIPTION OF THE DRAWINGS

The invention will be described with reference to the accompanying drawings, wherein like numbers reference like elements.

FIG. 6 shows Examples and Comparative Examples.

FIG. 9 shows models D1 to D10, where the color difference average dEav is not more than 1.5.

FIG. 10 shows reference models RD1 to RD5, where the color difference average dEav is more than 1.5.

FIG. 11 shows models D11 to D20, where the color difference average dEav is not more than 1.0.

FIG. 12 shows models D21 to D30, where the color difference average dEav is not more than 0.5.

FIG. 13 shows models D31 to D40, where the color difference average dEav is not more than 0.3.

FIG. 14 shows models D41 to D50, where the color difference average dEav is not more than 0.2.

DESCRIPTION OF EXEMPLARY EMBODIMENTS

Cause of Interference Fringes

Figure 1:
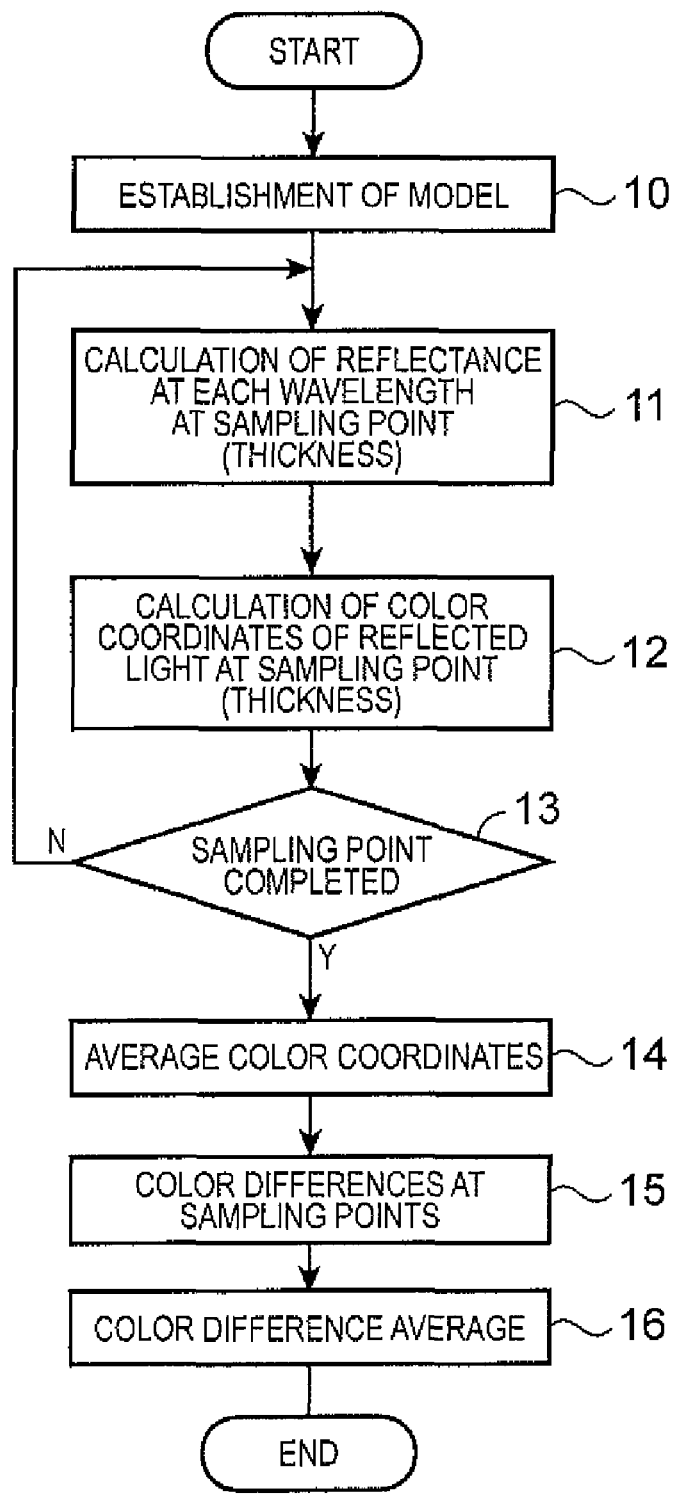
FIG. 1 is a flow chart schematically showing the process of simulation to evaluate the formation of interference fringes.

One of the fundamental causes of interference fringes is difference in refractive index. Therefore, in an attempt to eliminate interference fringes, adjustment of refractive index has been employed. However, the wavelength dependence of refractive index is disregarded in most cases. That is to say, the refractive index of a plastic substrate and the refractive index of a hard coating layer can be approximated, or, at a certain wavelength, can also be matched. However, when the material is different, the refractive index at each wavelength of light also differs, and it thus is nearly impossible to match the refractive indexes at every wavelength. The refractive index in the visible wavelength region (380 to 780 nm) is usually low on the long-wavelength side (the 780 nm side) and high on the short-wavelength side (the 380 nm side). Typically, as refractive index, one at the e-line (546 nm) is used. Unless otherwise noted, the refractive index herein also means the refractive index at the e-line. Accordingly, even when the refractive indexes at the e-line are the same, because of the wavelength dependence of refractive index, it rarely happens that refractive indexes are in complete agreement at all the wavelengths. This may be a factor for the formation of interference fringes.

Another cause of interference fringes is nonuniformity in the thickness of the film formed on the substrate. Specifically, when a uniform coating having a completely uniform thickness is formed on the surface of the substrate, a uniform color is observed as the only interference color, and interference fringes with a rainbow-like color are not formed. Usually, when the thickness is reduced, the intervals between interference fringes and the line width are likely to be increased, whereby interference fringes are suppressed. This is because in the case of a thin film, the absolute thickness value is small, and the range of variation is also small accordingly. Reduced thickness has thus, been believed to be desirable to suppress interference fringes. However, it is difficult to completely eliminate nonuniformity in thickness, i.e., variation in thickness, even when the coating method is devised. Further, non-uniformity is also caused due to the shape of the substrate, such as a lens, or the surface condition thereof. Accordingly, even when the thickness is reduced, variation in thickness cannot be completely eliminated, and this may be a factor for the formation of interference fringes.

Still another cause of interference fringes, especially of conspicuously observable interference fringes, is the light source. Under sunlight or like light containing light of various wavelengths at the same level of intensity, interference fringes are extremely difficult to observe. On the contrary, in the case of a three band fluorescent lamp or like light source in which the intensity of light is high at certain wavelengths, interference fringes are remarkably apparent. This is because light at three wavelengths (usually blue, green, and red) undergoes light interference due to the hard coating (thin film) on the substrate, and intensities are mutually increased or decreased, whereby the color balance of the light source is lost, and certain colors are strongly observed. Three band fluorescent lamps are often used for energy saving, and are widely used in ordinary households or offices.

According to the invention, the cause of such interference fringes is eliminated not by reducing but by, the other way around, increasing the thickness of the hard coating layer or a like layer formed on the optical substrate. That is, a larger thickness leads to a greater number of interference fringes, which results in poor appearance, so reduction in thickness has been proposed as a measure to control interference fringes. However, the present inventors forecast as follows: when the thickness is even more increased, the intervals of the resulting interference fringes are too small to be recognized by human eyes, so such interference fringes will be invisible. They made a calculation based on the following simulation to confirm such effects, and also conducted actual experiments.

Simulation Regarding Recognition of Interference Fringes

Figures 2, 3:
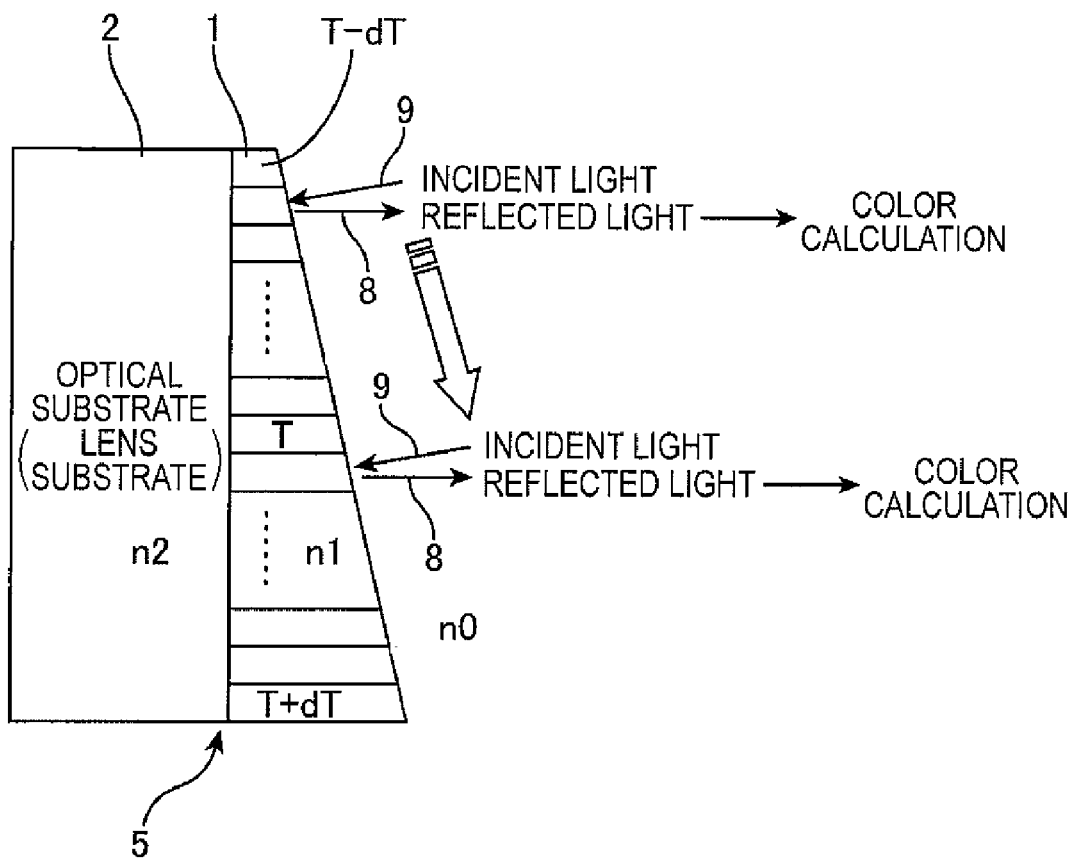
FIG. 2 shows a simulation model.
FIG. 3 shows reference data to evaluate color difference averages obtained by simulation.

FIG. 1 schematically shows a process of simulation regarding recognition of interference fringes. In step 10, a model (parameters) of an optical article 5 as shown in FIG. 2, such as a lens, is established. Typical examples of parameters include the refractive index n2 of an optical substrate 2, the thickness T of a hard coating layer or like transparent functional layer 1, the refractive index n1 of a functional layer 1, the thickness nonuniformity (thickness difference) dT in the functional layer 1, and the spectral distribution $S(\lambda)$ of a light source 9. The functional layer 1 is permeable (light-transmissive) in the visible light region. Further, the refractive index n1 of the functional layer 1 is constant, and is not changed in the thickness direction. An example of the wavelength distribution of a light source is the wavelength distribution of a typical fluorescent lamp specified in JIS Z 8719. Among several kinds of wavelength distributions, for the purpose of further emphasizing interference fringes, the relative spectral distribution according to the specification of the three band fluorescent lamp F10 can be used. In order to create interference fringes, the thickness difference dT of the functional layer 1 is necessary. For example, in the case of dip coating, a thickness difference dT of about ±20% or 30% of the central thickness T is preferably established.

Subsequently, in step 11, within the range of thickness T±dT, an adequate number of sampling points having different thicknesses are established, and the reflectance at each sampling point at the wavelengths in the visible light region is calculated every appropriate wavelength. For example, in the wavelength region of 380 to 780 nm, the reflectance is calculated every 1 nm (in 1 nm increments). Sampling points are established at 50 points up and 50 points down around the thickness T, giving 101 points in total.

In step 12, the reflectance at each wavelength is calculated. Also, from the spectral distribution $S(\lambda)$ of the light source (incident light) 9, color coordinates C(i) of the reflected light 8 are calculated. As the color coordinates, the coordinates in the color space of L*a*b* color system can be used, for example. In step 13, the above operation is repeated for all the sampling points, and, within the range of thickness T±dT, the color coordinates of the 101 points C(1) to C(101) are determined.

In step 14, the average color coordinates Cav are calculated from the above-determined 101 points' color coordinates C(i). In step 15, the color difference $\Delta E^*_{ab}(i)$ is calculated from the average color coordinates Cav for each color coordinates C(i) using the L*a*b* color system. Further, in step 16, the average dEav of the color differences $\Delta E^*_{ab}(i)$ was obtained as an evaluation value for evaluating the degree of interference fringes at the central thickness T. When the same color exists in many points in the plane of the optical article 5, the average dEav is small, while the average dEav is large when many colors exist in the plane.

Evaluation Method

For the evaluation of color difference average dEav, the correlation table of FIG. 3 showing the correlation between color difference $\Delta E$ on the NBS scale and human visual sensation was employed as the primary criterion. The NBS scale is a standard proposed by National Bureau of Standards. When the color difference $\Delta E$ on the NBS scale is not more than 1.5, the color difference is only slightly perceptible. Therefore, when the average dEav obtained from the above simulation is not more than 1.5, even in the case where interference fringes appear on the surface of the optical article 5, such interference fringes are expected to be only slightly perceptible to humans. Accordingly, such a result can be recognized as significant (category 1).

When the color difference $\Delta E$ is not more than 1.0, the difference is believed to be indistinguishable to humans, unless the colors are adjacent. Therefore, when the average dEav obtained from the above simulation is not more than 1.0, even in the case where interference fringes appear on the surface of the optical article 5, such interference fringes are expected to be only slightly perceptible to humans, with a smaller degree of color difference perception. Accordingly, such a result can be recognized as even more significant (category 2).

When the color difference $\Delta E$ on the NBS scale is not more than 0.5, the color difference is only barely perceptible. Therefore, when the average dEav obtained from the above simulation is not more than 0.5, even in the case where interference fringes appear on the surface of the optical article 5, such interference fringes are expected to be only barely perceptible to humans. Accordingly, such a result can be recognized as even more significant (category 3).

The minimum value that allows human color identification is 0.2, and this is sometimes called the Least Perceptible Difference (LPD). Therefore, when the average dEav obtained from the above simulation is not more than 0.2, even in the case where interference fringes appear on the surface of the optical article 5, such interference fringes are expected to be imperceptible to humans. Accordingly, such a result can be recognized as even more significant (category 5).

Even in the case where the color difference ΔE does not reach to the Least Perceptible Difference (LPD), when the color difference ΔE is not more than 0.3, such color difference is substantially difficult to distinguish by human eyes. Therefore, when the average dEav obtained from the above simulation is not more than 0.3, even in the case where interference fringes appear on the surface of the optical article 5, such interference fringes are expected almost imperceptible to humans. Accordingly, such a result can be recognized as significant (category 4).

Accordingly, the ranges shown in FIG. 3 are further divided to evaluate the averages dEav obtained by the simulation. Specifically, when a model (optical article) 5 has a color difference average dEav of more than 1.5, such a result does not have significance. A model (optical article) 5 having a color difference average dEav of not more than 1.5 results in interference fringes that are only slightly perceptible, and is thus preferable, and a model (optical article) 5 having a color difference average dEav of not more than 1.0 results in interference fringes with a smaller degree of slight perception, and thus is more preferable. A model (optical article) 5 having a color difference average dEav of not more than 0.5 results in interference fringes that are barely perceptible, and thus is preferable, and a model (optical article) 5 having a color difference average dEav of not more than 0.3 results in almost no interference fringes perceptible, and thus is more preferable. A model (optical article) 5 having a color difference average dEav of not more than 0.2 may result in interference fringes that are, if any, imperceptible to human eyes, and thus is most preferable.

Calculation of Reflectance, Step 11

The following is an example of the calculation method for the reflectance and reflected light at each sampling point (thickness). The phase difference 2δ between the wave reflected from the surface of the functional layer 1 and the wave reflected traveling back and forth to the functional layer 1 is expressed by the following formula:

$$2\delta = (4\pi/\lambda) n1 T \cos \phi \tag{7}$$

wherein n1 is the refractive index of the functional layer 1, T is the thickness of the functional layer 1, and φ is the incidence angle of a ray.

Reflection coefficient R is expressed by the following formula:

$$R(\lambda) = (r1 + r2 \exp(-2i\delta))/(1 + r1 r2 \exp(-2i\delta)) \tag{8}$$

wherein r1 and r2 are Fresnel coefficients, which are expressed, in the case of perpendicular incidence, by the following formula:

$$r1 = (n0 - n1)/(n0 + n1)$$

$$r2 = (n1 - n2)/(n1 + n2) \tag{9}$$

wherein n2 is the refractive index of the substrate 2, and n0 is the refractive index of air.

Calculation of Reflected Light, Step 12

Figure 4:
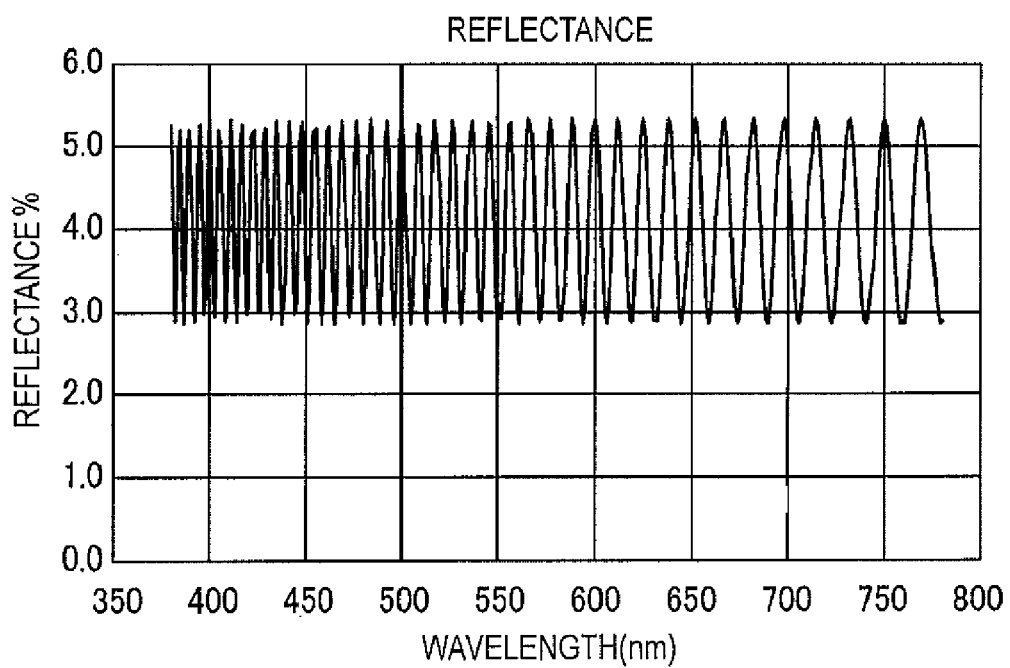
FIG. 4 shows an example of the distribution of reflection coefficient.

From the formula (8), the reflectance is calculated every 1 nm in the visible wavelength range of 380 to 780 nm. FIG. 4 shows the reflectance R(λ) determined using a model 5 in which the refractive index n2 of the substrate 2 is 1.60, the refractive index n1 of the functional layer 1 is 1.50, and the thickness T of the functional layer 1 is 10 μm.

Figure 5:
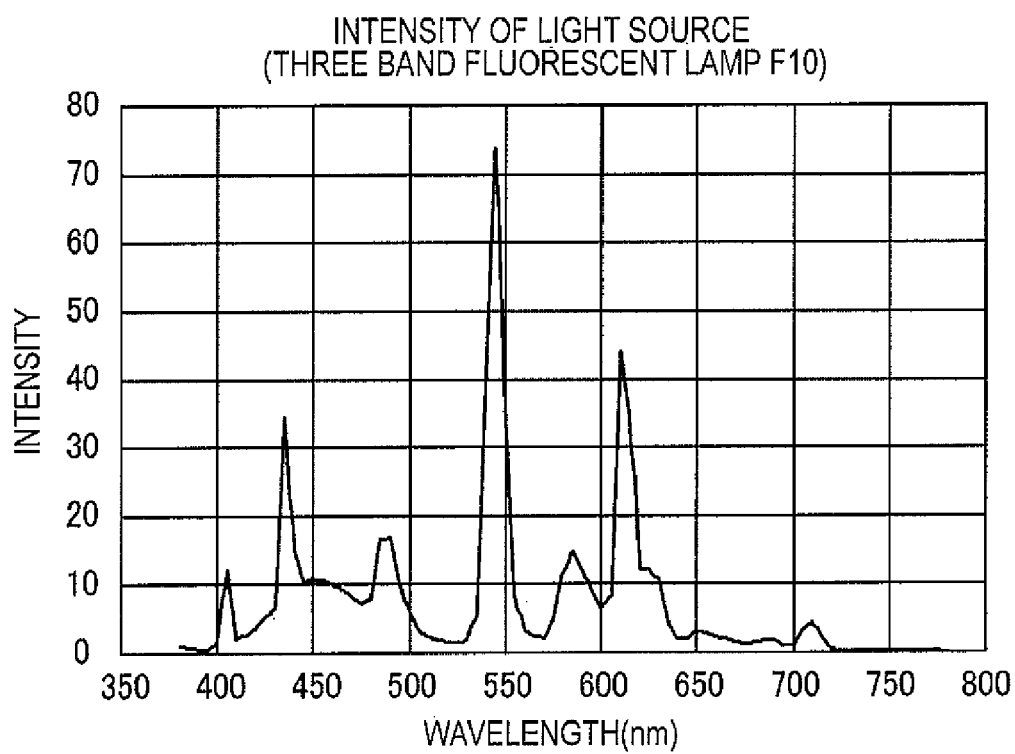
FIG. 5 shows an example of spectral distribution of light source (F10).

From the values of reflectance R(λ), tristimulus values (XYZ) are calculated using the formula below. The spectral distribution S(λ) of the light source 9 used in this case is the distribution of the three band fluorescent lamp F10 shown in FIG. 5. The reason for using the spectral distribution F10 is that under light of three wavelengths (three primary colors), imbalance between the three colors results in development of various colors, which causes interference fringes. On the contrary, in the case of the spectral distribution of artificial sunlight D65 light source, because the spectral distribution DES contains light of various wavelengths (colors), it hardly happens that certain colors are developed, and thus interference fringes are hardly observed.

$$X = K \Sigma_{380}^{780} S(\lambda) \cdot \bar{x}(\lambda) \cdot R(\lambda) d\lambda$$

$$Y = K \Sigma_{380}^{780} S(\lambda) \cdot \bar{y}(\lambda) \cdot R(\lambda) d\lambda$$

$$Z = K \Sigma_{380}^{780} S(\lambda) \cdot \bar{z}(\lambda) \cdot R(\lambda) d\lambda \tag{10}$$

In the above equations, $K = 100/\Sigma_{380}^{780} S(\lambda) \cdot \bar{y}(\lambda) d\lambda$, and $\bar{x}(\lambda)$, $\bar{y}(\lambda)$, and $\bar{z}(\lambda)$ are color-matching functions in the XYZ color system.

The CIEXYZ in the CIE color coordinates obtained from the formula (10) is (4.00, 4.13, 3.38).

Further, from XYZ, the color coordinates (L*, a*, b*) of the L*a*b* color system are calculated using the following formula:

$$L^* = 116(Y/Yn)^{1/3} - 16$$

wherein $Yn = K\Sigma_{380}^{780} S(\lambda) \cdot \bar{y}(\lambda) \cdot 1 d\lambda$ $$K = 100/\Sigma_{380}^{780} S(\lambda) \cdot \bar{y}(\lambda) d\lambda,$$

$$a^* = 500[(X/Xn)^{1/3} - (Y/Yn)^{1/3}]$$

$$b^* = 200[(Y/Yn)^{1/3} - (Z/Zn)^{1/3}]$$

wherein $Xn = K\Sigma_{380}^{780} S(\lambda) \cdot \bar{x}(\lambda) \cdot 1 d\lambda$, $$Zn = K\Sigma_{380}^{780} S(\lambda) \cdot \bar{z}(\lambda) \cdot 1 d\lambda \tag{11}$$

Color coordinates of the L*a*b* color system are (24.11, 0.21, 0.11).

Iterative Calculation for Sampling Points, Step 13

In this model, a thickness difference dT of ±30% of the 10-μm thickness T is established. Accordingly, at thicknesses of 7 to 13 μm, 50 thickness sampling points are established on the minus side of the thickness, and another 50 thickness sampling points are established on the plus side of the thickness. The above steps 11 and 12 are repeated for each point. For example, calculations of steps 11 and 12 are performed at a thickness of 7.00 μm, calculations of steps 11 and 12 are performed at a thickness of 7.06 μm, and calculations of steps 11 and 12 are performed at a thickness of 7.12 μm. In this manner, 101 sets of color coordinates (L*, a*, b*) are obtained.

Calculation of Average, Step 14

From the 101 sets of color coordinates, the average (center) color is calculated. Specifically, L*, a*, and b* are each averaged. In the case of this model, the average is (23.98, 0.0, 0.0).

Calculation of Color Difference, Step 15

The color difference between the L*, a*, b* average and the color coordinates of each of the sampling points (101 points) is calculated by the following formula:

$$\Delta E^* = [(\Delta L^*)^2 + (\Delta a^*)^2 + (\Delta b^*)^2]^{1/2} \tag{12}$$

Calculation of Color Difference Average, Step 16

The average dEav of color differences ΔE* of the sampling points is determined. In the case of this mode, the color difference average dEav was 0.40. Accordingly, interference fringes are only barely perceptible, and thus an optical article 5 showing almost no interference fringes can be provided.

The color difference average dEav changes with a change in the parameters of the model 5. Among the parameters, the average dEav is not so susceptible to the thickness nonuniformity (thickness difference) dT, and there is no large difference within the range of ±5 to 30%.
For example, in the above simulation, when only the thickness tolerance is changed, the results are as follows.

Model with a thickness tolerance of ±5%
Average of L*, a*, b*: (23.98, 0.0, 0.0), dEav: 0.27
Model with a thickness tolerance of ±10%
Average of L*, a*, b*: (23.98, 0.0, 0.0), dEav: 0.31
Model with a thickness tolerance of ±15%
Average of L*, a*, b*: (23.99, 0.0, 0.0), dEav: 0.33
Model with a thickness tolerance of ±20%
Average of L*, a*, b*: (23.99, 0.0, 0.0), dEav: 0.33
Model with a thickness tolerance of ±25%
Average of L*, a*, b*: (23.99, 0.0, 0.0), dEav: 0.36
Model with a thickness tolerance of ±30%
Average of L*, a*, b*: (23.98, 0.0, 0.0), dEav: 0.40

Comparison Between Examples and Simulation Results

Several optical articles of Examples and Comparative Examples were produced, and the visibility of interference fringes was compared with the results of evaluation using the simulation-based averages dEav.

Preparation of Coating Liquid for Forming Hard Coating Layer

First, 4.46 parts by weight of acid anhydride curing agent (trade name: liquid curing agent (C2) (Arakawa Chemical Industries)) was mixed with 20 parts by weight of epoxy resin-silica hybrid (trade name: Compoceran E102 (Arakawa Chemical Industries)), and stirred to give a liquid mixture (coating liquid).

Production of Optical Articles of Examples and Comparative Examples

The above-obtained coating liquid was applied onto a board 2 using a spin coater to a predetermined thickness, thereby forming a hard coating layer (functional layer) 1. Optical articles (spectacle lenses) 5 of Examples (E1 to E4) and Comparative Example (R1 and R2) were thus produced. Used as boards (substrates) 2, to which coating was applied, were Seiko Super Sovereign boards with a refractive index of 1.67 (E1, E2, and R1) and Seiko Prestige boards with a refractive index of 1.74 (E3, E4, and R2). Subsequently, the coated lens substrates were calcined at 125° C. for 2 hours.

Evaluation 1

Using a three band fluorescent lamp as a light source, interference fringes on the above-obtained spectacle lenses 5 were visually observed. The criteria are as follows.

Excellent: Interference fringes inappreciable
Good: Interference fringes slightly appreciable
Fair: Interference fringes appreciable
Poor: Interference fringes remarkably appreciable Evaluation 2

The reflectance of each of the above-obtained spectacle lenses 5 was measured by a spectral reflectometer at wavelengths of 380 to 780 nm, and, as in the simulation, the reflected color Lab* of the light source F10 was calculated from the measured reflectance. This operation was performed at random ten measurement points from the upper part to the lower part on the board, and the average thereof was determined. The color differences (ΔE) at the ten points were calculated from the average, and the average Eab of the color differences was calculated.

FIG. 6 shows the results thereof, together with the color difference average dEav obtained by simulation. As shown in the figure, the results of evaluation based on the color difference average dEav obtained by simulation are in close agreement with the results of evaluation of the products of Examples E1 to E4 and Comparative Examples R1 and R2.

Further, Example E1 is compared with Comparative Example R1, while Example E2 is compared with Comparative Example R2, in which the difference do between the refractive index n1 of the hard coating layer 1 and the refractive index n2 of the substrate 2 is the same. As a result, the lenses 5 of Examples E1 and E2 having a thicker hard coating layer 1 exhibit no or imperceptible interference fringes.

Further, the lenses 5 of Examples E3 and E4 having a refractive index difference dn as large as 0.25 also exhibit no or imperceptible interference fringes, because of the increased thickness of the hard coating layer 1.

Discussion 1

Figure 7:
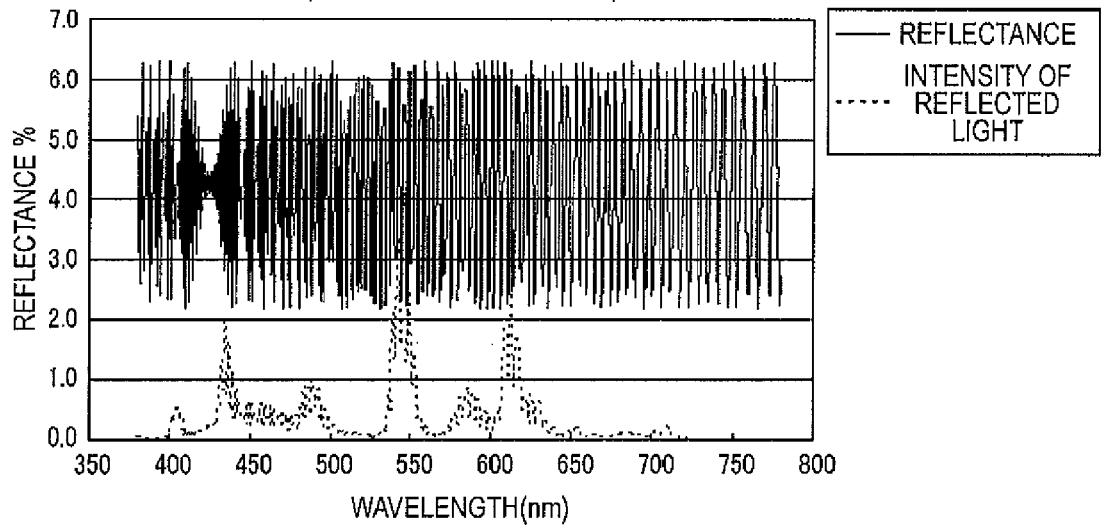
FIG. 7 shows an example of reflectance distribution in the Examples.

The following may explain one reason why interference fringes are suppressed on the lenses 5 having a thick hard coating layer 1 formed on the lens substrate 2. As an example of the reflectance of the lens 5 having a thick hard coating layer 1 formed on the lens substrate 2, FIG. 7 shows, in a solid line, the reflectance (calculated value) of a lens 5 comprising a lens substrate 2 with a refractive index (n2) of 1.67 and a functional layer 1 with a refractive index (n1) of 1.50 formed thereon to a thickness T of 30 μm. In this case, when a three band fluorescent lamp is used as the light source 9, the wavelength distribution of intensity of the reflected light 8 is as indicated with a dotted line. Because the thickness T is sufficiently large, the period of reflectance R(λ) in visible light region (380 to 780 nm) is repetition of fine waves at intervals of some nanometers. As a result, the relative distribution of intensity of the reflected light 8 maintains almost the same shape as that of the relative distribution S(λ) of the original light source 9. Therefore, even when the thickness changes to some extent, whereby the wave form of reflectance also changes, because the period of reflectance in the wavelength space of the intensity distribution (spectrum) is extremely short, the intensity distribution of the reflected light 8 maintains the same shape as that of the original intensity distribution S(λ) of the light source 9. Therefore, even when the thickness T changes, the color of the reflected light 8 does not change, and such a color is close to that of the light source 9. This indicates that even when the thickness changes to some extent, it is not likely to happen that certain colors are conspicuous. Interference fringes thus are hardly formed.

Figure 8:
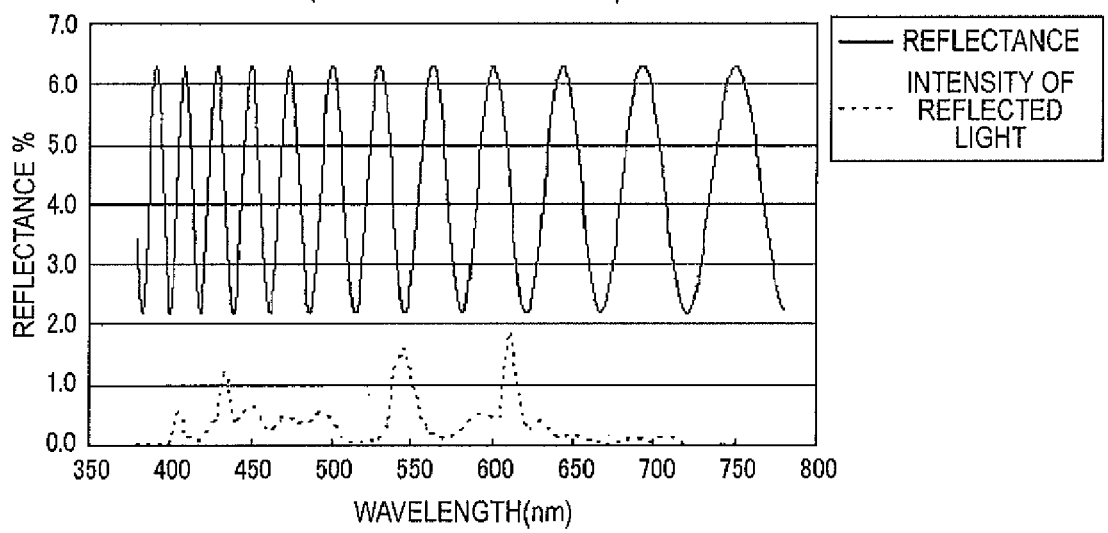
FIG. 8 shows an example of reflectance distribution in the Comparative Examples.

For comparison, FIG. 8 shows, in a solid line, the reflectance (calculated value) of a lens 5 comprising the same model, i.e., a lens substrate 2 with a refractive index (n2) of 1.67, and a functional layer 1 with a refractive index of (n1) 1.50 formed thereon to a thickness of 3 μm. The reflectance R(λ) line waves with gentle curves. Accordingly, the reflection intensity distribution of the reflected light 8 is influenced by the reflectance at each wavelength, and the peak of green near 550 nm in the spectral distribution S(λ) of the light source 9 greatly decreases, whereby the balance of light of the three band fluorescent lamp at three wavelengths (blue, green, and red) is lost. As a result, the color of the reflected light 8 is different from the original color of the light source 9. In addition, when the thickness T changes, the wave of reflectance R(λ) varies from side to side, and the peaks of reflected light 8 at three wavelengths (blue, green, and red) each repeatedly increase and decrease, presumably resulting in interference fringes having a rainbow color.

Minimum Thickness

The above indicates that when the thickness of the functional layer 1, such as a hard coating layer, laminated the like substrate 2 is increased (thickened), a lens 5 exhibiting no interference fringes perceptible can be provided even in the cases where there is a difference dn between the refractive index n2 of the substrate 2 and the refractive index n1 of the functional layer 1, and also the thickness of the functional layer 1 is non-uniform, has tolerance, or varies. Accordingly, in order to determine the minimum thickness that offers such effects, several models were simulated to determine the color difference average dEav. The models were selected so that the refractive index n2 of the substrate 2 was within the range of 1.50 to 1.90, and the refractive index n1 of the functional layer 1 was within the range of 1.50 to 1.90.

FIG. 9 shows, among such models, models D1 to D10 of the above category 1, i.e., those that have a color difference average dEav of not more than 1.5 and are not included in the category 2 where the color difference average dEav is not more than 1.0. FIG. 10 shows reference models RD1 to RD5 having a color difference average dEav of more than 1.5, which are not included even in the category 1.

FIG. 11 shows models D11 to D20 of the category 2, i.e., models that have a color difference average dEav of not more than 1.0 and are not included in the category 3 where the color difference average dEav is not more than 0.5.

FIG. 12 shows models D21 to D30 of the category 3, i.e., models that have a color difference average dEav of not more than 0.5 and are not included in the category 4 where the color difference average dEav is not more than 0.3.

FIG. 13 shows models D31 to D40 of the category 4, i.e., models that have a color difference average dEav of not more than 0.3 and are not included in the category 5 where the color difference average dEav is not more than 0.2.

FIG. 14 shows models D41 to D50 included in the category 5, i.e., models having a color difference average dEav of not more than 0.2.

Figure 15:
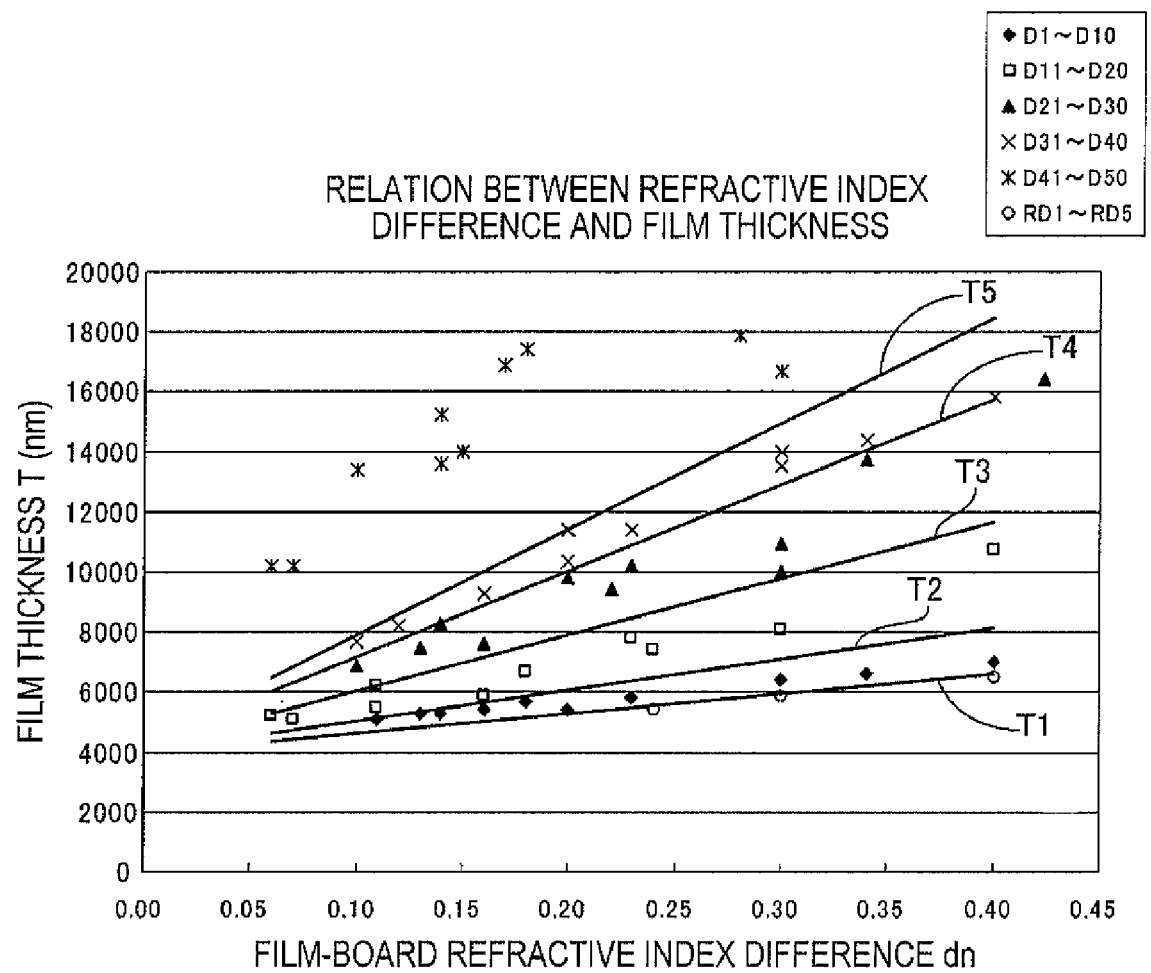
FIG. 15 plots the data of models D1 to D50 and reference models RD1 to RD5 with the refractive index difference dn between the film and the board as the X-coordinate and the film thickness T as the Y-coordinate. The minimum thicknesses T1 to T5 of the respective categories are also shown therein.

FIG. 15 plots the data of these models D1 to D50 and reference models RD1 to RD5 with the refractive index difference dn between the film and the board as the X-coordinate and the film thickness T as the Y-coordinate. These models D1 to D50 and reference models RD1 to RD5 are merely part of the models which the inventors run simulations on. As shown in the above-mentioned FIGS. 9 to 14, the simulation results were divided into groups considering whether included in one category and excluded from the higher category. In FIG. 15, the solid line gives minimum thicknesses T1 to T5 of the categories 1 to 5 that are determined therefrom. The minimum thicknesses T1 to T5 (μm) of the respective categories are as follows.

Minimum thickness $T1$ (μm) of category $1 = 6.5dn + 4.0$

Minimum thickness $T2$ (μm) of category $2 = 10.4dn + 4.0$

Minimum thickness $T3$ (μm) of category $3 = 18.7dn + 4.2$

Minimum thickness $T4$ (μm) of category $4 = 28.7dn + 4.3$

Minimum thickness $T5$ (μm) of category $5 = 35.2dn + 4.4$ (13)

It is accordingly turned out that in order for interference fringes to be absent or imperceptible to humans, a thicker functional layer 1 is desirable. However, human identification is impossible once the color difference is in the category 5, so a thickness to achieve further reduction of the color difference is unnecessary for suppressing the formation of interference fringes. Meanwhile, excessive increase in the thickness of the functional layer 1 is a waste of materials, and in addition, cracks are expected in the production process due to the volume change caused by drying after the film formation, etc.

Further, although thickening of the functional layer 1 reduces the chance of interference fringes even when the thickness varies, the surface accuracy of the functional layer is remarkably reduced. This is undesirable for the performance of an optical article or an optical element.

The thickness T of the functional layer 1 is thus preferably not more than 100 μm, where cracks are less likely to occur due to drying of a formed film. When the thickness is in such a range, the surface accuracy can be easily secured. Further, when the thickness T of the functional layer 1 is 50 μm or less, the surface accuracy can more easily secured. As is obvious form FIG. 14, even in the case where the refractive index difference dn is as extremely large as about 0.4, when the thickness is not less than 20 μm, interference fringes are almost invisible. Accordingly, the thickness of the functional layer 1 may be not less than 20 μm. Considering the variation in thickness at the time of film formation, for example, when the thickness T of the functional layer 1 is 20 to 50 μm, the formation of interference fringes can be suppressed almost regardless of the material of the substrate 2 or the material of the functional layers 1, such as a hard coating layer, laminated thereon.

Range of Thickness

From the above results, when the thickness T of the functional layer 1 is within the range of the following formula (1), the color difference falls under the category 1. Accordingly, the color difference due to interference fringes in only slightly perceptible. That is, in the case where the thickness is below the range of the following formula, the color difference due to interference fringes may be appreciable, and such a case is thus undesirable:

$$6.5dn + 4.0 \leq T \leq 100 \quad (1)$$

wherein the thickness T is larger than 5 μm, and the refractive index difference dn at the boundary of the optical, substrate and the functional layer satisfies the following condition:

$$0.06 \leq dn \leq 0.4 \quad (2).$$

Further, when the thickness T of the functional layer 1 is within the range of the following formula (3), the color difference falls under the category 2. Accordingly, although color difference due to interference fringes is slightly perceptible, the degree thereof is smaller.

$$10.4dn + 4.0 \leq T \leq 100 \quad (3)$$

When the thickness T of the functional layer 1 is within the range of the following formula (4), the color difference falls under the category 3. Accordingly, the color difference due to interference fringes is only barely perceptible.

$$18.7dn + 4.2 \leq T \leq 100 \quad (4)$$

Further, when the thickness T of the functional layer 1 is within the range of the following formula (5), the color difference falls under the category 4. Accordingly, although color difference due to interference fringes may be barely perceptible, the degree thereof is even smaller.

$$28.7dn + 4.3 \leq T \leq 100 \quad (5)$$

When the thickness T of the functional layer 1 is within the range of the following formula (6), the color difference falls under the category 5. Accordingly, almost no color difference due to interference fringes is perceptible.

$$35.2dn + 4.4 \leq T \leq 100 \quad (6)$$

As mentioned above, it is more preferable that the maximum thickness Tmax of the functional layer 1 is 50 μm. Further, the minimum thickness Tmin of the functional layer 1 is not limited to 5 μm, and may also be 6 μm or 7 μm. Further, the range of the refractive index difference dn is not limited to a range of not less than 0.06, and may also be a range of not less than 0.07 or not less than 0.08. The invention is particularly effective where the refractive index difference dn is large, and the refractive index difference dn may be not less than 0.1. In the light of the refractive index n2 of the plastic lens substrate currently considered and the refractive index n1 of the resin used for forming the functional layer, such as a hard coating layer, the upper limit of the refractive index difference dn is set at about 0.4. However, as explained above, no upper limit is set on the refractive index difference dn, and it may be 0.50 and may also be 0.60 or more.

Thus, in the above optical article 5, the thickness T of the functional layers 1, such as hard coating, is lager than the wavelengths of visible light (380 to 780 nm), particularly not less than 10 μm (10000 nm) that is far larger than the visible wavelength, whereby the formation of interference fringes is suppressed.

Accordingly, when a functional layer having the above thickness is formed on an optical substrate, such as a lens, even in the case where the refractive index of the functional layer is different from the refractive index of the optical substrate, the formation of interference fringes can be suppressed. Accordingly, even when the optical substrate, such as a lens substrate, is different, it is possible to achieve commonality of coating system among the hard coating layer laminated on the substrate, the primer layer explained below, the antireflection film further provided thereon, and the antifouling film (antifouling layer). For this reason, regardless of the refractive index of the lens substrate or other optical substrates, only one production line is required for the hard coating layer or the like, and also only one kind of antireflection film thereon is necessary. Accordingly, an extremely simple production line can be applied for various optical substrates to produce spectacle lenses and like optical articles. The production cost can thus be reduced.

In the above Examples, a hard coating layer is described as an example of the functional layer 1. However, the structure of the hard coating layer is not limited thereto. Examples of resins for forming the hard coating layer include acryl-based resin, melamine-based resin, urethane-based resin, epoxy-based resin, polyvinyl-acetal-based resin, amino-based resin, polyester-based resin, polyamide-based resin, vinyl-alcohol-based resin, styrene-based resin, silicon-based resin, and mixtures or copolymers thereof. The resin for forming the functional layer included by the invention is not limited insofar as a transparent coating can be formed, and may be any of general-purpose resins used as coating agents. However, in consideration of that the functional layer 1 mainly functions as a protective film, silicon-based resin, acryl-based resin, and urethane-based resin are preferably used for the hard coating layer. For a primer layer for imparting adhesion, urethane-based resin and polyester-based resin are preferably used. The hard coating layer is not limited to a monolayer, and may also have a multilayer structure.

The functional layer 1 is not limited to the hard coating layer, and may also include at least one primer layer that is laminated between at least one hard coating layer and the optical substrate 2. The primer layer may be provided to secure the adhesion between the lens substrate 2 and the hard coating layer and/or improve the shock resistance that has been a defect of a high-refractive-index lens substrate. Examples of resins for forming the primer layer include acryl-based resin, melamine-based resin, urethane-based resin, epoxy-based resin, polyvinyl-acetal-based resin, amino-based resin, polyester-based resin, polyimide-based resin, vinyl-alcohol-based resin, styrene-based resin, silicon-based resin, and mixtures or copolymers thereof. For the primer layer for imparting adhesion, urethane-based resin and polyester-based resin are preferably used.

When the refractive index of the lens substrate is n2, the refractive index of the primer layer is n3, and the refractive index of the hard coating layer is n1, these refractive indexes preferably satisfy the following formula:

$$n2 \leq n3 \leq n1 \text{ or } n2 \geq n3 \geq n1 \qquad (14).$$

When materials are selected to satisfy this relation, the difference between the maximum reflectance and the minimum reflectance can be reduced, and the resulting wave form of reflectance is more flat. Accordingly, interference fringes can be further suppressed. In a functional layer containing several layers having different refractive indexes, reflection may occur between the internal layers. The frequency characteristics of reflectance are thus complicated, giving a wider variety of factors for the formation of interference fringes. However, when the above-disclosed thickness as the whole functional layer 1 is secured, the formation of interference fringes can be suppressed.

The method for forming a functional layer, such as a hard coating layer, on an optical substrate, such as a lens, may be any of the publicly known coating methods. Spin coating is preferable to make the thickness more uniform. On the other hand, in order to apply coating to a plurality of lenses at once placing prime importance on productivity, dipping is preferable.

Further, an inorganic antireflection film or an organic antireflection film may also be formed on the functional layer 1. An antireflection layer is a thin layer that is formed on the hard coating layer if necessary. The antireflection layer may be formed, for example, by alternately laminating a low-refractive-index layer with a refractive index of 1.3 to 1.5 and a high-refractive-index layer with a refractive index of 1.8 to 2.3. The number of layers is preferably about five or seven.

Example of inorganic substances used for layers that form the antireflection layer include $SiO_2$, $SiO$, $ZrO_2$, $TiO_2$, $TiO$, $Ti_2O_3$, $Ti_2O_5$, $Al_2O_3$, $TaO_2$, $Ta_2O_5$, $NbO$, $Nb_2O_3$, $NbO_2$, $Nb_2O_5$, $CeO_2$, $MgO$, $Y_2O_3$, $SnO_2$, $MgF_2$, and $WO_3$. These inorganic substances are used singly, or alternatively, two or more kinds are used in mixture. An example of the antireflection layer is one having a $SiO_2$ layer as a low-refractive-index layer and a $ZrO_2$ layer as a high-refractive-index layer.

Examples of methods for forming the antireflection layer include dry methods, such as vacuum deposition, ion plating, and sputtering. As vacuum deposition, it is also possible to employ ion-beam-assisted deposition, in which an ion beam is applied simultaneously during vacuum evaporation.

The antireflection layer may also be formed using a wet method. For example, the layer may be formed by applying a coating composition for forming an antireflection layer, which contains silica-based particles having an inner cavity (hereinafter sometimes referred to as "hollow silica-based particles") and an organic silicon compound, in the same manner as in the formation of the hard coating layer and the primer layer. The reason for using hollow silica-based particles is as follows. The inner cavity thereof may contain a gas or solvent having a lower refractive index than that of silica, whereby the particles have reduced refractive index as compared with silica-based particles having no cavity. As a result, excellent antireflection effects can be imparted. Hollow silica-based particles can be produced by a method described in JP-A-2001-233611, but those having an average particle diameter of 1 to 150 nm and a refractive index of 1.16 to 1.39 are preferably used. The organic antireflection layer preferably has a thickness of 50 to 150 nm. When the thickness is larger or smaller than this range, sufficient antireflection effects may not be provided.

Further, a water-repellent film or a hydrophilic antifogging film (antifouling film) may also be formed on the antireflection film. The antifouling layer is a layer comprising a fluorine-containing organosilicon compound and is formed on the antireflection layer for the purpose of improving the water-repellent and oil-repellent properties of the optical article surface. Examples of fluorine-containing organosilicon compounds include fluorine-containing silane compounds described in JP-A-2005-301208 and JP-A-2006-126782, for example.

A fluorine-containing silane compound is preferably dissolved in an organic solvent to a prescribed concentration and used as a water-repellent processed liquid (coating composition, for forming an antifouling layer). The antifouling layer can be formed by applying the water-repellent processed liquid (coating composition for forming an antifouling layer) onto the antireflection layer. The coating method therefor may be dipping, spin coating, or the like. In addition, it is also possible to charge the water-repellent processed liquid (coating composition for forming an antifouling layer) into metal pellets, and then form an antifouling layer using vacuum deposition or a like dry method.

The thickness of the antifouling layer is not limited, and is preferably 0.001 to 0.5 µm, and more preferably 0.001 to 0.03 µm. When the antifouling layer is too thin, this results in poor water-repellent and oil-repellent effects, while when the layer is too thick, the resulting surface is sticky, so both cases are undesirable. Further, when the thickness of the antifouling layer exceeds 0.03 µm, the antireflection effects may be impaired.

In the above embodiments, a spectacle lens is mainly taken as an example of the optical article. The invention enables to provide a pair of spectacles comprising a spectacle lens made of plastic provided with a thick hard coating layer as above and a frame having mounted thereto such a spectacle lens. When such spectacles are exposed to the light of a fluorescent lamp in a room, an office, etc., interference fringes hardly appear on the surface of the lenses. Therefore, unsightly appearance can be prevented, and reflected glare and like problems can also be suppressed. Accordingly, spectacles with high commercial value can be provided.

The optical article is not limited to a spectacle lens. In an indoor environment, such as in a room, an office, or a factory, or in other places, the invention can be also applied to an optical article whose surface is exposed to a fluorescent lamp or like light having non-white spectral distribution. Examples thereof are televisions, computer displays, windows, and like systems that include an optical article with at least one side thereof facing the outside and are used for seeing an image through the optical article.

The entire disclosure of Japanese Patent Application No: 2008-306049, filed Dec. 1, 2008 is expressly incorporated by reference herein.

What is claimed is:

1. An optical article comprising:
   an optical substrate, and
   a functional layer laminated on the surface of the optical substrate,
   the functional layer having a thickness T µm that satisfies the following condition:

$6.5dn+4.0 \leq T \leq 100$ wherein the thickness T is larger than 5 µm, and dn is the refractive index difference at the boundary of the optical substrate and the functional layer and satisfies the following condition:

$0.06 \leq dn \leq 0.4$, and wherein a thickness non-uniformity dT of the functional layer is between ±30% of the thickness T.

2. An optical article according to claim 1, wherein the thickness T of the functional layer satisfies the following condition:

$10.4dn+4.0 \leq T \leq 100$.

3. An optical article according to claim 2, wherein the thickness T of the functional layer satisfies the following condition:

$18.7dn+4.2 \leq T \leq 100$.

4. An optical article according to claim 3, wherein the thickness T of the functional layer satisfies the following condition:

$28.7dn+4.3 \leq T \leq 100$.

5. An optical article according to claim 4, wherein the thickness T of the functional layer satisfies the following condition:

$35.2dn+4.4 \leq T \leq 100$.

6. An optical article according to claim 1, wherein the thickness T of the functional layer is not more than 50 µm.

7. An optical article according to claim 1, wherein the functional layer includes a hard coating layer.

8. An optical article according to claim 7, wherein the functional layer includes a primer layer that is laminated between the hard coating layer and the optical substrate.

9. An optical article according to claim 1, further comprising an antireflection film laminated on the functional layer.

10. An optical article according to claim 9, further comprising an antifouling film laminated on the antireflection film.

11. An optical article according to claim 1, wherein the optical substrate is a plastic lens substrate.

12. An optical article according to claim 11, wherein the optical article is a spectacle lens.

13. A pair of spectacles comprising:
    a spectacle lens according to claim 12, and
    a frame having mounted thereto the spectacle lens.

14. A system including an optical article according to claim 1 and for seeing an image through the optical article, the optical article facing the outside.

15. A method for producing an optical article, comprising forming a functional layer on an optical substrate,
    the functional layer having a thickness T µm that satisfies the following condition:

$6.5dn+4.0 \leq T \leq 100$ wherein the thickness T is larger than 5 µm, and dn is the refractive index difference at the boundary of the optical substrate and the functional layer and satisfies the following condition:

$0.06 \leq dn \leq 0.4$, and wherein a thickness non-uniformity dT of the functional layer is between ±30% of the thickness T.

16. A method for film production, comprising forming a functional layer on an optical substrate, the functional layer having a thickness T µm that satisfies the following condition:

$6.5dn+4.0 \leq T \leq 100$ wherein the thickness T is larger than 5 μm, and dn is the refractive index difference at the boundary of the optical substrate and the functional layer and satisfies the following condition:

$0.06 \leq dn \leq 0.4$, and wherein a thickness non-uniformity dT of the functional layer is between ±30% of the thickness T.

* * * * *